United States Patent
Army et al.

(10) Patent No.: US 9,062,813 B2
(45) Date of Patent: Jun. 23, 2015

(54) CUSHION CLAMP SUPPORT WITH POSITIONING FEATURE

(71) Applicant: Hamilton Sundstrand Corporation, Windsor Locks, CT (US)

(72) Inventors: Donald E. Army, Enfield, CT (US); Michael A. Jaworski, Windsor, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 62 days.

(21) Appl. No.: 13/907,100

(22) Filed: May 31, 2013

(65) Prior Publication Data

US 2014/0353448 A1    Dec. 4, 2014

(51) Int. Cl.
| F16L 3/00 | (2006.01) |
| F16M 13/00 | (2006.01) |
| F16B 7/18 | (2006.01) |
| F16B 33/00 | (2006.01) |
| F16L 3/24 | (2006.01) |
| F16L 3/123 | (2006.01) |

(52) U.S. Cl.
CPC ........... *F16M 13/00* (2013.01); *Y10T 29/49826* (2015.01); *F16B 7/182* (2013.01); *F16B 33/002* (2013.01); *F16L 3/24* (2013.01); *F16L 3/123* (2013.01)

(58) Field of Classification Search
CPC ....... F16M 13/00; F16B 7/182; F16B 33/002; F16L 3/24; F16L 3/123; Y10T 29/49826
USPC ...................... 248/56, 71, 73, 68.1
See application file for complete search history.

(56) References Cited

U.S. PATENT DOCUMENTS

| 5,820,082 | A  * | 10/1998 | Wright ............................. 248/65 |
| 6,641,093 | B2 * | 11/2003 | Coudrais ......................... 248/73 |
| 8,313,064 | B2 * | 11/2012 | Stocker ........................... 248/71 |
| 2008/0105796 | A1 * | 5/2008 | Nix et al. ........................ 248/73 |
| 2010/0294896 | A1 * | 11/2010 | Sayilgan ......................... 248/73 |

FOREIGN PATENT DOCUMENTS

| FR | 2439928 A1 | 5/1980 |
| WO | 9829677 A1 | 7/1998 |

OTHER PUBLICATIONS

European Search Report for Application No. EP14170695. Mailed on Nov. 14, 2014. 4 pages.

* cited by examiner

*Primary Examiner* — Gwendolyn W Baxter
(74) *Attorney, Agent, or Firm* — Cantor Colburn LLP

(57) ABSTRACT

Embodiments include a cushion clamp support and assembly and related method. In one embodiment the cushion clamps support includes a support base and a support bracket for receiving the support base. The support base and the support bracket are substantially flat in selective corresponding areas that align when disposed adjacent to one another to prevent further rotation. The support base and the support bracket each have complementary retention features that correspond to one another such that the retention features engage one another to secure the support base to the support bracket. The support bracket has a plurality of opposing lips for receiving at least a portion of a cushion clamp.

15 Claims, 5 Drawing Sheets

CUSHION CLAMP SUPPORT WITH POSITIONING FEATURE

BACKGROUND OF THE INVENTION

The present disclosure relates generally to techniques providing support to a clamp and more particularly to a cushion clamp support with positioning feature.

A clamp is a fastening device that holds or secures objects tightly together to prevent movement. Cushion clamps are a type of clamp that loops around another object, often of a circular diameter, such as a pipe, hose or tubing. After looping around the object, the two sides of the clamp are then brought together and fastened by a variety of methods such as using a fastener. Besides preventing further movement, cushion clamps are used to provide separation between adjacent components. Cushion clamps are often manufactured of a variety of different materials that are sturdy but provide some measure of flexibility.

Cushion clamps can be used to reduce shock and vibration caused by fluid surges in pipes, tubes, and hoses used in both mobile and stationary industrial applications. Therefore, cushion clamps are used extensively throughout many industries, particularly the aerospace industry, for providing structural support in system utilities that incorporate tubes, hoses, electrical wires and the like. Cushion clamps can be used in a variety of applications. They are also used in line replacement units (LRU) such as pressure sensors.

An objective of any cushion clamp is to provide support but also enhance the required separation between adjacent structures to minimize the risk of rubbing or chafing that can lead to system failures. This provides a challenge, however, in system utilities that are exposed to continuous pressure and vibration. A solid mounting, in such conditions, is necessary but difficult to achieve. The structural integrity and the mounting has to be provided in a manner that is unaffected by movement, especially vibration over time.

BRIEF DESCRIPTION OF THE INVENTION

According to one embodiment, a clamp support is provided having a support base with a support base retention feature. A support bracket is provided for receiving the support base. The support base has a plurality of opposing lips for receiving at least a portion of a cushion clamp, the support base including support base retention features adapted to mate with the support base retention features. The support base and the support bracket can be substantially flat in selective corresponding areas that align when disposed adjacent to one another to prevent rotation.

In another embodiment a clamp support assembly is provided including a support base and a support bracket for receiving the support base. The support bracket can have a clamp engagement element for receiving a plurality of cushion clamps such that opposing lips are disposed along the clamp engagement element in each area enabled to receive one of the plurality of cushion clamps. The support base and the support bracket can be substantially flat in selective areas that align when disposed adjacent to one another to prevent rotation. The support base and the support bracket can each have complementary retention features that engage with one another.

In yet another embodiment, a method for supporting a clamp is provided that includes assembling a support bracket around a support base. The support bracket and support base can each have complementary, corresponding substantially flat surfaces in areas that align when disposed adjacent to one another to prevent rotation. The method can also include engaging complementary retention features of the support bracket with complementary retention features of the support base. A cushion clamp can be disposed, at least partially, between opposing lips provided on a receiving component of the support bracket.

Additional features and advantages can be realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
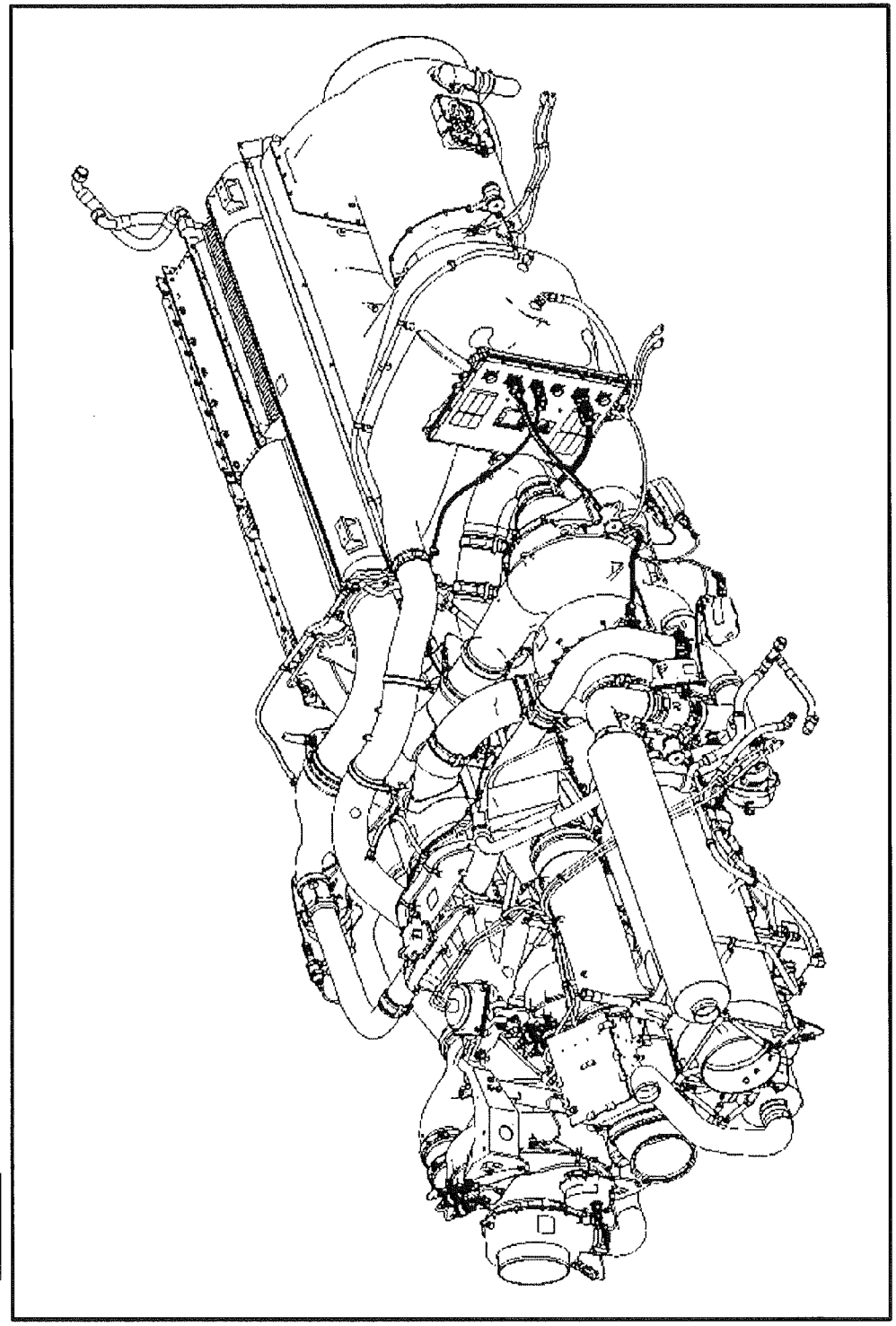
FIG. 1 is an illustration of an air conditioning pack enabled to use a cushion clamp in accordance with several embodiments.

FIG. 1 is an illustration of an air conditioning pack 50 such as can be used in aerospace systems. Cushion clamps are used in such environments to provide additional support for some components and prevent close contact of other adjacent components. The example air conditioning pack 50 provided in FIG. 1, is only one of many where a cushion clamp can be used to protect equipment, such as attached to multiple utilities of an aircraft.

It has been discovered that in some instances a cushion clamp can be improperly mounted or rotated after installment over time due to vibration, or may be caused during installation during human errors. In most cases, human error or sudden or continuous movement can rotate the clamp about the centerline to an unacceptable position.

Figure 2:
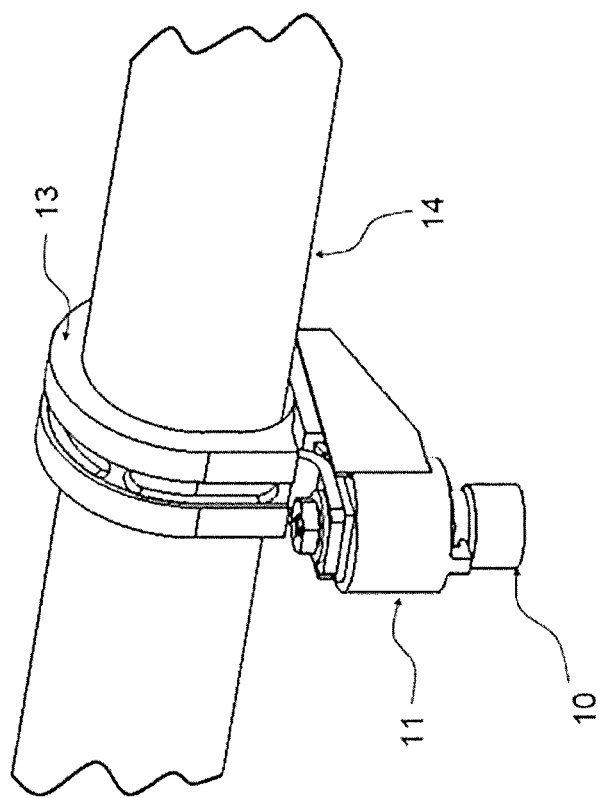
FIG. 2 depicts a perspective view of a cushion clamp support with positioning feature in accordance with one embodiment.

FIG. 2 provides an illustration of a cushion clamp support with positioning feature as per one embodiment. In the embodiment shown in FIG. 2, two mating components 10, 11 are shown. As illustrated, the first mating component is a support base 10 that can act in one embodiment act as a foundation. The support base 10 can be fixed to the system equipment or primary structure, in one embodiment, but in alternate embodiments other arrangements can be presented. In one embodiment, the support base 10 is affixed to system equipment or another assembly by different techniques. Such affixation techniques may include but are not limited to bonding, brazing or welding. In one embodiment, the support base 10 is affixed to a portion of an aircraft such as, for example, an airframe or the like.

A support bracket 11 is provided as the second mating portion or component. The support bracket 11 can be assembled around the support base 10 or alternatively the support base 10 can be received by the support bracket 11 such as by disposing the support base 10 in an internal receptacle (23 in FIG. 4) of the support bracket. In one embodiment, the support bracket 11 and/or receptacle 23 are structured to correspond to and complement the support base 10. In one embodiment, the support base 10 is not entirely disposed inside the support bracket 11. In the embodiment shown in FIG. 2, the support base 10 extends, at least partially, beyond a lower side of the support bracket 11, as shown at 26 in FIG. 3

The support bracket 11 may provide additional structural support to a cushion clamp 13. In the illustrated embodiment, clamp 13 is used to support a system utility such as tube 14 that that may be a rigid tubing, flexible hoses or electrical wiring among other components. In other embodiments, the tube 14 could be replaced by any other type of element that is to be supported.

Figure 3:
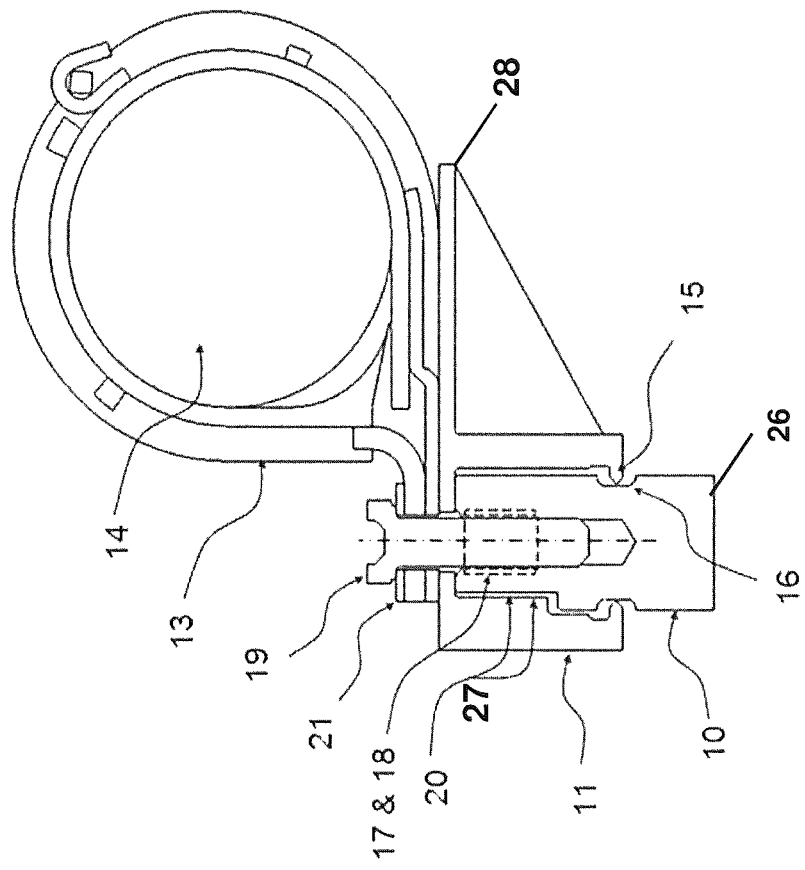
FIG. 3 depicts a sectional view of the embodiment illustrated in FIG. 3.

FIG. 3 provides a more detailed illustration of the embodiment shown and discussed in conjunction with FIG. 2. Some of the same numbers used in FIG. 2 are also used in FIG. 3 to provide consistency in discussion. The support base 10 and support bracket 11, in this embodiment each incorporate features for retention. The retention features for the support bracket 11 and the support base 10 are complementary and disposed selectively to correspond to one another in a manner so that they can engage with one another to secure the support base 10 to the support bracket 11 in a particular location. For example, in one embodiment, the support bracket 11 has a plurality of integral retention clips 15. These retention clips are complementary with a plurality of detents or grooves 16 provided on an external surface of the support base 10. In one embodiment, the support bracket's 11 retention clips 15 can snap into the detent or groove 16 on the support base 10 to hold the support bracket 11 in place, for example, during assembly. In alternate embodiments, however, other arrangements can be made to provide for a corresponding and complementary design of elements and features on the support base 10 and support bracket 11 that can engage with one another to provide a locking mechanism. In one embodiment, as discussed, the retention features of the support base 10 and support bracket 11 can be disposed to selectively provide for placement of the support base 10 in relation with the support bracket 11.

In one embodiment, the support base 10 can also incorporate a tapped hole 17 and a helicoil insert 18 (hereinafter helicoil) to mate with a fastener, such as the threaded fastener 19, to further secure the support base 10, support bracket 11 and clamp 13. In one embodiment, for example, the threaded fastener 19 can further engage with the helicoil 18 to prevent movement once the support bracket 11 and the support base 10 have been secured to one another and the clamp 13. Again as before, this arrangement is optional and provided in a number of other manners in alternate embodiments.

In one embodiment, after the support base 10 and support bracket 11 are engaged, additional and different ways can be provided to prevent rotation or other similar movements between them due to, for example, user error or vibration. In one embodiment, for example, as shown in FIG. 3, the support base 10 and the support base 11 are substantially flat only in selective areas such that they correspondingly align when disposed adjacent to one another to prevent relative rotation between them. For example, in one embodiment the structure of the support bracket's internal receptacle 23 (See FIG. 4) and the support base 10 can be curved or substantially curved in all areas except in areas denoted by reference numerals 20 and 27 Areas 20 and 27 of the support base 10 and support bracket 11 (along the receptacle in this example) are selectively manufactured to be substantially flat and complementary in shape such that when they are disposed adjacent to one another they provide a complementary structure. In one embodiment, the flat surfaces 20 and 27 once placed next to one another can reduce or prevent misplacement due to errors and prevent further rotation of the support base 10 and the support bracket 11 relative to each other due to other unintended movements. In the embodiment of FIG. 3, these flat surfaces 20/27 can function as a timing feature to control the support bracket 11 and cushion clamp 13 orientation and prevent them from further rotation. In other words, the curved surface of the remainder of the support base 10 and support bracket 11 in combination with the flat surfaces 20/27 provided selectively, help ensure that the support base 10 and support bracket 11 engage as desired and little or no relative rotation is possible.

The components provided in the assembly of FIGS. 2 and 3, including the support base 10 and support bracket 11 can be manufactured from a variety of materials. In one embodiment, the manufactured material is strong and has adequate rigidity. Some examples are high-strength plastics, metal, and plastic and/or metal composites. The support base 10, in one embodiment, may also be fabricated integral to its component by means of, but not limited to casted, molded or machined. In addition, the support base 10 and support bracket 11 can be made of different materials or by different methodology. In one embodiment, the support bracket can also include an arm 28 that can support a pipe, hosing or other facility to provide additional structural support.

Figure 4:
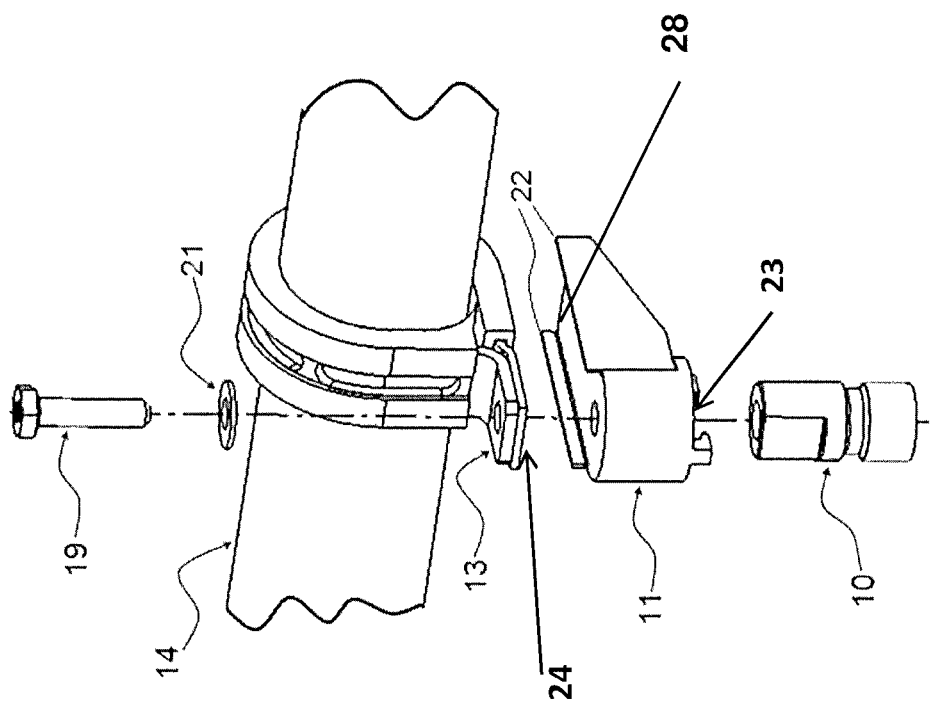
FIG. 4 depicts an exploded view of a cushion clamp support with positioning feature in accordance with the embodiments of FIG. 2 and FIG. 3.

FIG. 4 depicts an exploded illustration to enable better viewing of embodiment such as those discussed in conjunction with FIG. 2 and FIG. 3. Support bracket 11 is assembled to the support base 10 in this embodiment. Engagement is confirmed with the support bracket 11 snapping into place or through other alternate methodology as discussed previously. Clamp 13 is positioned onto the support bracket 11 by nesting the cushion clamp engagement element 24 between opposing raised edges or lips 22 of the arm 28 of support bracket 11 as shown in this embodiment. A threaded fastener 19 can be used, in this embodiment as well, to secure the assembly together. A washer 21 can also be used as shown in FIG. 4 but the use of the washer 21 is optional and can be omitted in some alternate embodiments.

Figure 5:
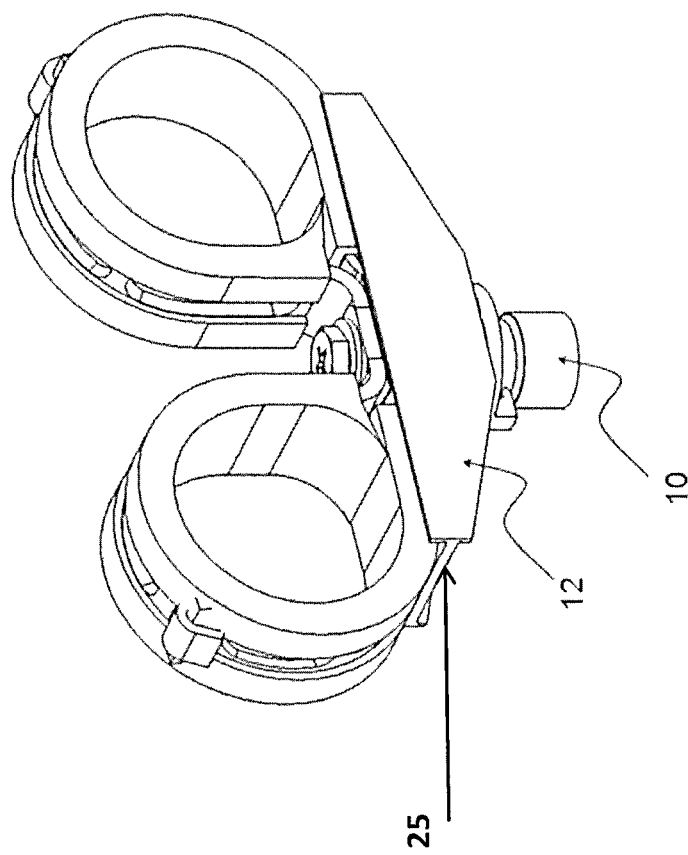
FIG. 5 depicts a perspective view of an alternate embodiment of a cushion clamp support with positioning feature.

FIG. 5 is an illustration of an alternate embodiment. In FIG. 5, a support bracket 12 that is similar to the support bracket 11 of FIGS. 2 through 4 is used. The support bracket 12, is designed and manufactured to support a plurality of cushion clamps 13. In FIG. 5, the support bracket 12 is shown to support two cushion clamps for ease of clarity with the understanding that other alternate embodiments supporting multiple clamps 13 can be utilized in other embodiments.

In the embodiment of FIG. 5, one of the two clamps 13 can be positioned onto the support bracket 12 by nesting the cushion clamp between raised edges 22 of the support bracket 12 as shown in this embodiment. The support bracket has a clamp engagement element 25 for receiving a plurality of cushion clamps. The clamp engagement element 25 has a plurality of opposing lips 22 as before for receiving the plurality of cushion clamps 13. In the embodiment shown, a second clamp can be placed adjacent to the first clamps and the engagement component 24 of each clamp can be positioned such that both of the engagement components can be secured to the support bracket 12. For example, in one embodiment, the engagement component 24 of the second clamp can be placed over the corresponding engagement component 24 of the first clamp. In one embodiment, this may require the clamp engagement element 25 of the support bracket 12 to be slightly elevated on one end or a selective area so as to compensate for any gap occur by placing the second clamp over the first clamp at the support bracket. This can also allow for the support base 10, support bracket 12 and the plurality of clamps 13 to all be secured to one another with a single fastener, such as the threaded fastener (and helicoil) as discussed in FIGS. 3 and 4.

As before, after one or both cushion clamps are disposed appropriately, they are then affixed to the support base 10 and support bracket 12. In one embodiment as shown, a single support base 10 and support bracket 12 is provided (as before). In this embodiment, a single threaded fastener 19 can be used to secure the assembly together. A washer 21 can also be used optionally as discussed before.

Referring back to FIG. 5, while the double cushion clamp support with positioning feature assembly of FIG. 5 provides similar design and construction to the embodiments discussed in conjunction with FIG. 2-4, the support bracket 12 extends in multiple directions depending on how many cushion clamps are to be used. A similar multi-directional design can be provided for support brackets that provide support to a plurality of cushion clamps as can be appreciated by those skilled in the art. It should be noted that while only two cushion clamps are shown in FIG. 5, as discussed, more than two clamps can be housed in similar fashion in alternate embodiments. In such a case, opposing lips are provided in each area that is to receive each separate clamp. One or more support bracket 11 and support base 10 can also be used.

The cushion clamp support with positioning feature assemblies and components as discussed with several embodiments shown in FIGS. 3-6 can offer a light weight, low cost solution for providing additional support to clamps that can potentially fail in a high vibration environment. The integral feature (used also as a timing feature), embedded in some of the embodiments as discussed, that can mate with a corresponding feature such as the simple flat surface of the mating support base and nest the cushion clamp into the support bracket provide additional securing features. The integral retention clip that can be used in some embodiments, can engage a detent in the support base and hold the support bracket in place as an aid to the mechanic during the assembly of the parts.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A clamp support having:
   a support base having a support base retention feature; and
   a support bracket for receiving the support base including an arm having a plurality of opposing lips for receiving at least a portion of a cushion clamp, the support bracket including support bracket retention features adapted to mate with the support base retention features;
   the support base and the support bracket being substantially flat only in selective corresponding areas that align when the support base is received by the support bracket that prevent rotation of the support base and the support bracket relative to one another;
   wherein the support base extends into the support bracket so that a fastener can secure the support base, the support bracket and a support clamp with one another when the cushion clamp is disposed at least partially between the opposing lips;
   wherein the support base has a receiving element for receiving the fastener;
   wherein the fastener is disposed partially in the support base and the support bracket to secure the support base to the support bracket; and
   wherein the fastener is a threaded fastener and a helicoil is disposed inside the support base around the receiving element so as to engage with the threaded fastener to prevent movement after the support bracket and the support base are secured to one another.

2. The clamp support of claim 1, wherein the support bracket is configured to receive the support base in an internal receptacle and the substantially flat areas of the support bracket are disposed alongside the internal receptacle.

3. The clamp support of claim 2, wherein the support base extends beyond the internal receptacle of the support bracket.

4. The clamp support of claim 1, wherein the retention feature for the support bracket includes a plurality of clips and the retention features for the support base includes a plurality of grooves.

5. The clamp support of claim 4, wherein the support bracket is configured to receive the support base in an internal receptacle and the plurality of grooves are disposed on opposite sides of the support base so as to engage with correspondingly located clips of the support bracket.

6. The clamp support of claim 5, wherein the clips and the grooves are selectively located to allow the support base to be disposed in a selective position inside the internal receptacle.

7. The clamp support of claim 1, wherein the receiving element includes a tapped hole.

8. The clamp support of claim 1, wherein the support bracket is made of at least one rigid plastic component.

9. The clamp support of claim 1, wherein the support bracket is made of metal plastic or metal components.

10. The clamp support of claim 1, wherein the support base is made of at least one rigid plastic component.

11. The clamp support of claim 1, wherein the support base is made at least partially of metal.

12. A clamp assembly, comprising:
    a support base having a support base retention feature, the support base having a clamp engagement element for receiving a plurality of cushion clamps, the clamp engagement element including opposing lips arranged and configured to receive one of the plurality of cushion clamps; and
    a support bracket for receiving the support base, the support base including support bracket retention features adapted to mate with the support base retention features;
    the support base and the support bracket being substantially flat only in selective corresponding areas that align when disposed adjacent to one another to prevent rotation of the support base and support bracket relative to one another;
    wherein the support base extends into the support bracket so that a fastener can secure the support base, the support bracket and a support clamp with one another when the cushion clamp is disposed at least partially between the opposing lips;
    wherein the support base has a receiving element for receiving the fastener;

wherein the fastener is disposed partially in the support base and the support bracket to secure the support base to the support bracket; and wherein the fastener is a threaded fastener and a helicoil is disposed inside the support base around the receiving element so as to engage with the threaded fastener to prevent movement after the support bracket and the support base are secured to one another.

13. The clamp support assembly of claim 12 wherein the cushion clamps can be disposed partially over one another so that the cushion clamps and the clamp support can be all fastened to one another using a single fastener.

14. The clamp support assembly of claim 12, wherein the plurality of opposing lips disposed along the clamp engagement element are located such that at least two cushion clamps can be disposed partially on top of one another.

15. The clamp support assembly of claim 14, wherein the clamp engagement element is raised in selective areas so that when the clamps are disposed over one another the support bracket and the clamps are in contact with one another without any gaps.

\* \* \* \* \*